Sept. 30, 1969 J. W. BALDE 3,470,541

METAL-INSULATION-METAL STORAGE UNIT AND METHOD OF USING

Filed Dec. 30, 1965

INVENTOR

J. W. Balde,

BY

S. Gundersen

ATTORNEY

United States Patent Office
3,470,541
Patented Sept. 30, 1969

3,470,541

METAL-INSULATION-METAL STORAGE UNIT AND METHOD OF USING

John W. Balde, Raritan Township, Hunterdon County, Flemington, N.J., assignor to Western Electric Company, Incorporated, New York, N.Y., a corporation of New York Filed Dec. 30, 1965, Ser. No. 517,600
Int. Cl. G11c *11/24, 11/14*
U.S. Cl. 340—173 10 Claims

ABSTRACT OF THE DISCLOSURE

A layer of film-forming metal is anodized and coated with a conducting layer to form a metal-insulation-metal storage unit. Applying a gradual increasing voltage of opposite polarity to the anodizing voltage across the unit decreases the reverse conductivity of the unit. The unit retains the decreased reverse conductivity characteristic until a voltage of the same polarity as the anodizing voltage is applied to revert the unit to its initial reverse conductivity.

This invention relates to a method of and an apparatus for storing information and more particularly to a method of and an apparatus for storing information in a thin-film memory device.

With increasing requirements for storing large amounts of information, it is desirable to store such information in a memory device which occupies very little space. While thin-film memory devices meet the space criteria, almost all prior thin-film memory devices use magnetic materials in which information may be sensed only by erasing the stored information. In permanent memories using magnetic materials, the erased information must be restored.

Accordingly, it is an object of the present invention to produce a new and improved method of and apparatus for storing information.

Another object of the invention resides in a thin-film memory device made in accordance with present thin-film technology.

A further object of the invention is a method of and an apparatus for storing information in which the stored information may be sensed without erasure.

In accordance with these and other objects, the present invention contemplates a method of and apparatus for storing information in an anodized capacitor-type thin-film memory device by changing the conductivity state of such thin-film capacitor. The stored information is then sensed by nondestructively detecting the conductivity state of the device.

More particularly, a plurality of thin-film capacitors each has a metal layer contacting a dielectric layer formed by anodizing the surface of a film-forming metal. A slowly increasing positive voltage is applied to all the metal layers with respect to the film-forming metals for a predetermined duration to decrease the conductivity through the dielectric layers. A negtaive voltage pulse is applied to the metal layers with respect to the film-forming metals of selected capacitors for increasing the conductivity through the dielectric layers of the selected capacitors to their normal state. The conductivity of the selected capacitors represents stored information. The stored information is read out by applying a positive voltage to the metal layers with respect to the film-forming metals and then sequentially sensing the current through the capacitors to determine the conductivity of the capacitors and thereby sense the capactior or capacitors which have stored information without destroying that stored information.

Alternately, the slowly increasing positive voltage may be applied to the metal layers with respect to film-forming metals of selected capacitors to decrease the conductivity through the dielectric layers of the selected capacitors to store information.

Other objects and advantages of the present invention will be apparent from the following detailed description when considered in conjunction with the accompanying drawings, wherein.

Figures 1, 2, 3:
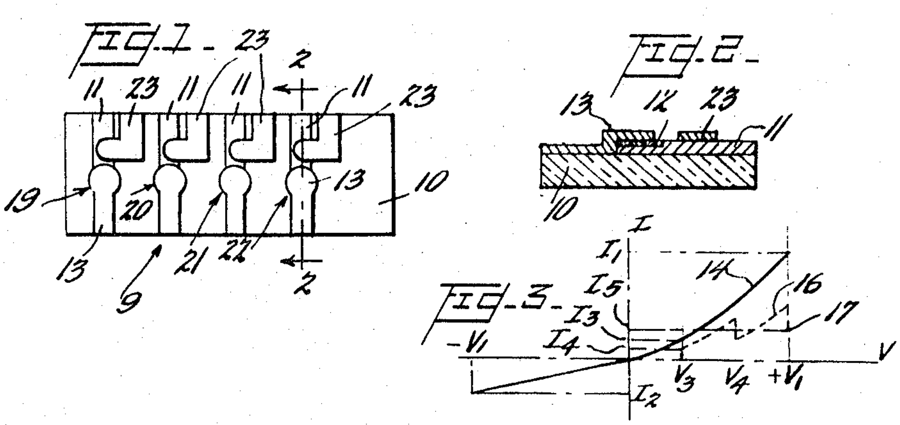
FIG. 1 is a plan view of a thin-film memory unit.
FIG. 2 is a cross-sectional view of the thin-film unit shown in FIG. 1 as seen along the plane of line 2—2.
FIG. 3 is a curve of the electrical characteristic of the thin-film unit.

Referring first to FIGS. 1 and 2, there is shown a thin-film memory unit 9 having a substrate 10 of glass or glazed ceramic upon which strips or films 11 of film-forming metal are deposited. The ends of the film-forming metal 11 are anodized to produce a dielectric layer 12 thereon. A metal layer 13 deposited on the substrate 10 overlaps and makes contact with the anodized layer 12.

The metal film 11 and the metal layer 13 contacting the dielectric layer 12 from the electrodes of a thin-film capacitor which may be manufactured according to the teachings of Patent 2,993,266 to R. W. Berry. As taught by that patent, the film-forming metal film 11 is deposited by a condensation method, such as cathodic sputtering or vacuum evaporation techniques. Several suitable film-forming metals are tantalum, niobium, aluminum, and titanium. The end portions of the strips of metal film 11 are next immersed in a typical anodizing electrolyte and made positive with respect to another electrode immersed in the electrolyte in order to anodize such portions. The metal layer 13 is then applied in contact with the dielectric layer 12 by conventional methods, such as vacuum evaporating a metal, such as gold or aluminum, through a suitable mask.

The electrical characteristics of the thin-film capacitor produced by these techniques are shown by a curve 14 in FIG. 3. The capacitor exhibits a unidirectional conductivitity characteristics. That is, if a positive voltage $V_1$ is applied to the metal layer 13 with respect to the metal film 11, the capacitor initially conducts a current $I_1$. If a voltage $V_1$ of negative polarity having the same magnitude as the voltage $V_1$ is applied, a current $I_2$ flows through the capacitor which is much less in magnitude than $I_1$. The conductivity of the dielectric layer 12 to a current of positive polarity from the metal layer 13 to the metal film 12 is referred to as reverse conductivity and the conductivity of the dielectric layer 12 in the opposite direction is referred to as forward conductivity. Thus, the normal reverse conductivity is much greater than the forward conductivity.

A slowly increasing positive voltage applied to the metal layer 13 with respect to the metal film 11 for a predetermined duration changes the unidirectional conductivity characteristic. Referring to a curve 16 in FIG. 3, if a positive voltage $V_3$ is applied to the metal layer 13 with respect to the metal film 11 for a predetermined duration, the current magnitude gradually reduces from $I_3$ to $I_4$. When the voltage is increased to $V_4$ and allowed to remain at $V_4$ for a duration of time, a similar reduction in current occurs. Thus, by slowly increasing the voltage to $V_1$, the reverse conductivity of the capacitor is decreased and a current $I_5$ corresponding to point 17 flows through the capacitor.

The positive voltage applied to the metal layer 13 with respect to the metal film 11 must be increased slowly to $V_1$ to prevent the reverse current through the capacitor from increasing above a minimum magnitude. If the reverse current is allowed to increase above this minimum magnitude, then the reverse conductivity of the capacitor does not readily decrease but remains substantially unchanged. A very large reverse current may even create enough heat in the capacitor to break down the dielectric layer, thus producing an arcing between the metal layer 13 and the metal film 11 and destroying the capacitor. The voltage may be increased slowly by (1) increasing the voltage in steps to point 17 as shown by the curve 16 or (2) by applying a voltage which gradually increases in magnitude to $V_1$ over a duration of time.

The capacitor will retain this changed conductivity characteristic until a negative voltage is applied to the metal layer 13 with respect to the metal film 11. If a positive voltage of magnitude $V_1$ is later applied to the metal layer 13 with respect to the metal film 11 of the capacitor having the decreased reverse conductivity state, a current of magnitude $I_5$ flows through the capacitor. However, if a negative voltage pulse of magnitude $V_1$ is applied to the metal layer 13 with respect to the metal film 11, the capacitor reverts back to its original conductivity state. After reversion back to the original conductivity state, a current of magnitude $I_1$ flows through the capacitor when a positive voltage $V_1$ is initially applied to the metal layer 13 with respect to the metal film 11.

One possible theory explaining the change of conductivity in the capacitor is that during the anodizing of the film-forming metal the dielectric layer is formed in the presence of an electrical field thus freezing the molecules of the dielectric layer in such alignment as to produce a dipole in a first direction. When a dielectric field is applied in a direction opposite to the formation voltage for a duration of time, the dipoles are forced to align in a second direction opposite to the first direction. A change in the conductivity characteristics of the capacitor seems to accompany this. Then when a dielectric field is reapplied in the direction of the formation voltage which would cause the dipoles to realign in the first direction, the conductivity is restored to its initial value.

In a capacitor having tantalum as the film-forming metal 11 and gold as the metal layer 13, and where the tantalum metal strip 11 is anodized with a formation voltage of 200 volts, the capacitor may be of such size as to have initially a reverse conductivity of $10^{-5}$ mhos and a forward conductivity of $10^{-8}$ mhos. A positive voltage is applied to the gold layer 13 with respect to the tantalum film 11 and is slowly increased in magnitude to 100 volts over a period of time of 60 seconds to decrease the reverse conductivity to $10^{-7}$ mhos. Subsequently, a positive readout voltage of 100 volts is applied to the gold layer 13 with respect to the tantalum film 11 through a $10^{-5}$ mho current-limiting resistor connected in series with the capaictor, and the voltage sensed across the resistor is 1 volt which indicates that the reverse conductivity of the capacitor remains at $10^{-7}$ mhos. A negative voltage pulse of 100 volt magnitude is then applied for a duration of a microsecond to the gold layer 13 with respect to the tantalum film 11. Now, a positive readout voltage of 100 volts is applied to the gold layer 13 with respect to the tantalum film 11 through the $10^{-5}$ mho current-limiting resistor and the voltage sensed across the resistor is 50 volts which indicates that the reverse conductivity of the capacitor has changed from $10^{-7}$ mhos to $10^{-5}$ mhos, its original state.

The value of the current-limiting resistor is chosen such that current through the capacitor in the high reverse conductivity state is large enough to inhibit substantial decrease in reverse conductivity and small enough to avoid breakdown of the capacitor. Also, the time of application of the positive readout voltage is limited to one or two seconds to add to the inhibiting of any substantial decrease in reverse conductivity to insure that the readout voltage may be applied many times to make many separate determinations of the reverse conductivity state without substantially changing that conductivity state.

A plurality of these capacitors may be used as a non-destrustive permanent memory. Preferably, all of the capacitors are conditioned by applying a slowly increasing positive voltage to the metal layers with respect to the metal films of all capacitors for a predetermined duration to decrease the reverse conductivity through all the capacitors. Information is stored by selectively applying a negative voltage pulse to the metal layer with respect to the metal film of one or more of the capacitors to increase the reverse conductivity of the selected capacitor or capacitors back to their normal value. The stored information may then be determined by applying a positive voltage for a short duration of time to the metal layers with respect to the metal films of the capacitors through current-limiting resistors connected in series with the capacitor and sensing the magnitude of the voltage across the resistors to determine the stored information without destroying the stored information.

Accordingly, a plurality of capacitors 19, 20, 21, and 22 are manufactured on a substrate 10 to form a thin-film memory 9, as shown in FIG. 1. Each of the capacitors 19–22 has a resistance strip 23 contacting a portion of the metal film 11 to form a current limiting resistance in series with the capacitor. These resistance strips, for example, may be applied by sputtering tantalum metal in a nitrogen and argon atmosphere through a suitable mask to deposit tantalum nitride resistance strips on the substrate 10 in contact with the metal film 11.

Figure 4:
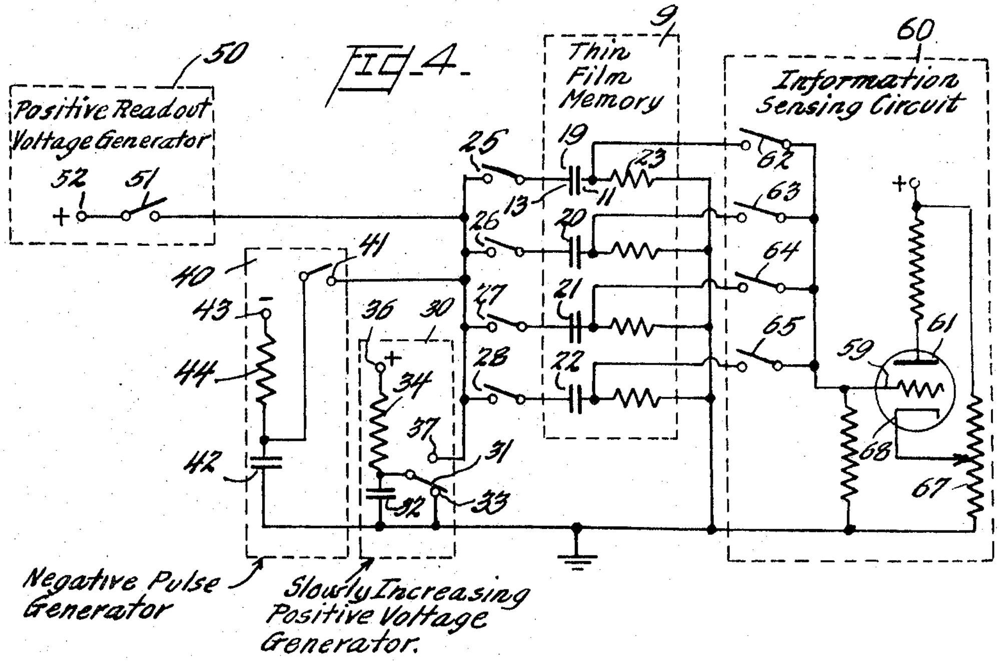
FIG. 4 is an electrical schematic of an apparatus for storing and sensing information in the thin-film unit according to the principles of the invention.

Referring now to FIG. 4, a circuit is shown for storing and sensing information in the thin-film memory 9 of FIG. 1. The circuit comprises a slowly increasing positive voltage generator 30, a negative pulse generator 40, a positive readout voltage generator 50, and an information-sensing circuit 60. The slowly increasing positive voltage genrator 30 conditions the capacitors 19–22 by changing them from their normally high conductivity state to a low conductivity state. The negative pulse generator 40 stores information in one or more of the capacitors 19–22 by changing the conductivity state of the selected capacitor from the low conductivity state back to the normal high conductivity state. The positive readout voltage generator 50 applies a voltage across the capacitors 19–22 and the resistance strips 23 to produce a current through the resistance strips 23. The voltage produced by the current through the resistance strips 23 is sensed by the information-sensing circuit 60 to determine the capacitors having the high conductivity state to determine the stored information.

The switches 25–28 are respectively connected to metal layers 13 of each of the capacitors 19–22. The resistance strips 23 are connected to a ground reference. The slowly increasing positive voltage generator 30 is connected to a common terminal of the switches 25–28. A double throw switch 31 in the generator 30 is connected to a first terminal of a capacitor 32 and normally closes a circuit through its contact 33 to the ground reference, thus shorting the capacitor 32 to ground. The capacitor 32 is connected by its first terminal to a resistor 34 connected to a positive voltage source 36 and by its second terminal to the ground reference. The switch 31 has a second contact 37 connected to the common terminal of the switches 25–28. When the switch 31 is moved to its contact 37, a current flowing through resistor 34 charges the capacitor 32 to increase the voltage across the terminals of the capacitor 32 at a rate determined by the time constant of the resistor 34 and the capacitor 32.

In order to change the reverse conductivity of the capacitors 19–22 from their normally high value to a lower value, switches 25–28 are closed prior to the movement of the switch 31 contacting the contact 37. The slowly increasing positive voltage across the capacitor 32 is applied through the contact 37, switches 25–28, and resistance strips 23 to all the capacitors 19–22 to change them to their low reverse conductivity state. The switch 31 is then returned to contact 33 and the switches 25–28 are opened.

Now, one or more of the switches 25–28 are selectively closed in accordance with the information desired to be stored. A switch 41 connects the common terminal of the switches 25–28 to a first terminal of a capacitor 42 in the negative pulse generator 40. The capacitor 42 is connected by its first terminal to a negative voltage source 43 by a resistor 44 and by its second terminal to the ground reference. Normally, the capacitor 42 is charged to a voltage equal to the voltage source 43.

Then the switch 41 is closed, whereupon the capacitor 42 discharges through the capacitors and resistance strips 23 connected to the selected switch or switches, thus increasing the reverse conductivity through one or more of the capacitors 19–22 in accordance with the information desired to be stored.

A positive readout voltage generator 50 is connected to the common terminal of the switches 25–28. All the switches 25–28 are closed. A switch 51 in the positive readout voltage generator 50 is closed to connect a positive voltage source 52 to the metal layers 13 of all the capacitors with respect to the ground to produce a current through the capacitors and the resistance strips 23. The current through the selected capacitor or capacitors having the high reverse conductivity state is limited by the respectively connected resistance strips 23 to prevent breakdown of the selected capacitor or capacitors. Also, the current through the dielectric layer of the selected capacitor is large enough to inhibit decrease in the reverse conductivity of the selected capacitor or capacitors. The switch 51 is only closed for a short period of time to help prevent decrease of the reverse conductivity. Thus, the readout voltage generator may be connected to the capacitors many times without destroying the stored information.

An information sensing circuit 60 is sequentially connected across each of the resistance strips 23 to sense the magnitude of the voltage produced across the resistance strips 23. A grid 59 of a vacuum tube 61 is connected to a common terminal of switches 62–65. The other terminals of switches 62–65 are connected to respective metal films 11 of the capacitors 19–22. The tube 61 is normally biased non-conductive by a positive voltage applied through a potentiometer 67 connected to the cathode 68 of the tube 61. This bias is adjusted to render the tube 61 non-conductive for grid voltages produced across a resistance strip 23 connected to a capacitor in its high conductivity state and conductive for grid voltages produced across a resistance strip 23 connected to a capacitor in its low conductivity state.

The switches 62–65 are sequentially closed and opened a predetermined time after the readout voltage is applied to the capacitors to sense successively the magnitude of voltage across respective resistance strips 23 produced by the current from the readout voltage generator 50. The predetermined delay between operation of the generator 50 and the operation of the sensing circuit allows the capacitors 19–22 to charge, thus preventing the initial current surge through the resistance strips 23 from giving a false output signal. A delay of five times the time constant of the capacitor 19 and the resistance strip 23 is sufficient. When a voltage across a resistance strip 23 has a magnitude greater than the positive bias voltage applied to the cathode 68 of tube 61, the tube 61 is rendered conductive to indicate a high conductivity state in the capacitor connected to the closed switch.

Alternately, the information may be stored by selectively applying a slowly increasing positive voltage to the metal layers with respect to the metal films of one or more of the plurality of capacitors. The information is then erased by applying a negative voltage pulse to the metal layers with respect to the metal films of all the capacitors.

This alternate embodiment is accomplished by selectively closing one or more of the switches 19–22 prior to the operation of the contactor 31 to connect the slowly increasing positive pulse generator to the memory. Thus, the slowly increasing positive voltage is applied through the contact 37, the selected switch or switches, and the resistance strips 23 to the capacitors connected to the selected switch or switches to change the conductivity of the capacitors connected to the selected switch or switches.

Also in the alternate embodiment, all of the switches 25–28 are closed when the negative pulse generator is operated to erase the stored information. Closing the switch 41 discharges the capacitor 42 through all the capacitors 19–22 to erase any stored information by increasing the conductivity of any capacitors containing stored information.

Figure 5:
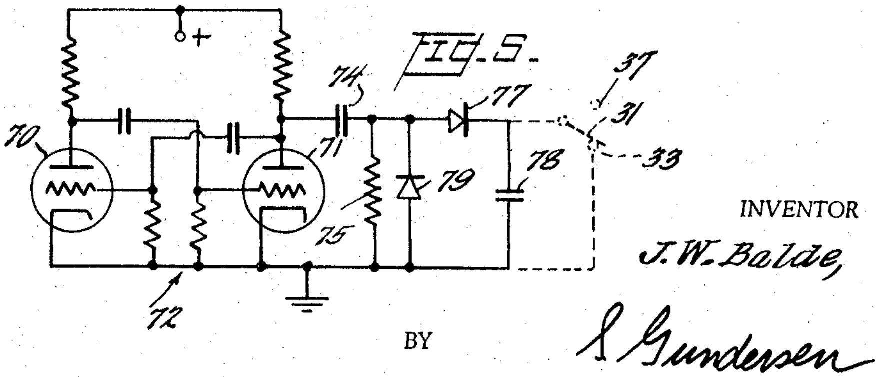
FIG. 5 is an electrical schematic of a slowly stepped positive voltage generator which may be substituted for the slowly increasing positive voltage generator shown in FIG. 4.

In FIG. 5 there is shown an alternate slowly increasing positive voltage generator which may be substituted for the generator 30 in FIG. 4. Tubes 70 and 71 are interconnected as an astable multivibrator or oscillator 72 in a conventional manner. A differentiator circuit comprising a serially connected capacitor 74 and resistor 75 differentiates the output pulse of the oscillator 72 to produce sharp negative and sharp positive pulses. The sharp positive pulses pass through a diode 77 and are stored on a capacitor 78. The sharp negative pulses pass through a diode 79 to ground. Thus, the voltage across capacitor 78 is increased by the sharp positive pulses as a stepped voltage. This stepped voltage may then be applied by the contactor 31 to the common terminal of the switches 25–28 to decrease the conductivity of the thin-film capacitors 19–22.

It is to be understood that the above-described arrangements of apparatus and construction of elemental parts are simply illustrative of the application of the principles of the invention and many other modifications may be made without departing from the scope of the invention.

What is claimed is:

1. An apparatus for storing information comprising:
a thin-film unit having a layer of conductive metal contacting a dielectric layer formed by anodizing a surface of a film-forming metal;
means coupled to said film-forming metal and said metal layer for applying a positive voltage to said metal layer with respect to said film-forming metal for a predetermined duration to decrease the conductivity through said dielectric layer; and
means coupled to said film-forming metal and said metal layer for sensing the conductivity through said dielectric layer.

2. The apparatus of claim 1 in which the film-forming metal is selected from the group consisting of tantalum, niobium, aluminum, and titanium.

3. An apparatus for storing information comprising:
a plurality of thin-film units each having a metal layer contacting a dielectric layer formed by anodizing the surface of an oxidizable metal film;
means coupled to said plurality of units for applying a positive voltage to said metal layers with respect to said metal films for a predetermined duration to decrease the conductivity through said dielectric layers of said units;
means coupled to said plurality of units for selectively applying a negative voltage pulse to a metal layer with respect to a metal film of a unit to increase the conductivity through the dielectric layer of the selected unit; and means coupled to said units for sensing the unit having the increased conductivity through the dielectric layer.

4. An apparatus for storing information as defined in claim 3 in which:

the metal layer is selected from the group consisting of gold and aluminum;

the oxidizable metal film is selected from the group consisting of tantalum, niobium, aluminum, and titanium;

the positive voltage applying means applies a slowly increasing positive voltage to the metal layers with respect to the metal films of the units to decrease the conductivity through the dielectric layers of the units; and the sensing means applies a positive voltage to the metal films with respect to the metal layers to sense the unit having the increased conductivity through the dielectric layer.

5. An apparatus for storing information comprising:

a plurality of thin-film units each having a metal layer contacting a dielectric layer formed by anodizing the surface of an oxidizable metal film;

means coupled to said plurality of units for selectively applying a positive voltage to a metal layer with respect to a metal film of a unit for a predetermined duration to decrease the conductivity through the dielectric layer of the selected unit;

means coupled to said units for sensing the unit having the decreased conductivity state; and means coupled to said plurality of units for applying a negative voltage pulse to said metal layers with respect to said metal films to increase the conductivity through the dielectric layer of the unit having the decreased conductivity state.

6. An apparatus for storing information as defined in claim 5 in which:

the oxidizable metal film is selected from the group consisting of tantalum, niobium, aluminum, and titanium;

the positive voltage applying means applies a slowly increasing positive voltage to the metal layer with respect to the metal film of the selected unit; and the sensing means applies a positive voltage to the metal layers with respect to the metal films to sense the unit having the decreased conductivity.

7. A method of storing information in a plurality of thin-film capacitors, each having a layer of conductive metal contacting a dielectric layer formed by anodizing a surface of an oxidizable metal film, comprising the steps of:

applying a positive voltage to said metal layers with respect to said metal films for a duration sufficient to decrease the conductivity through said dielectric layers;

applying a negative voltage pulse to a metal layer with respect to a metal film of a selected capacitor to increase the conductivity through the dielectric layer of the selected capacitor; and sensing the conductivity of the selected capacitor by applying a positive voltage to the metal layer with respect to the metal film of the selected capacitor.

8. A method of storing information in a plurality of thin-film capacitors, each having a layer of conductive metal contacting a dielectric layer formed by anodizing a surface of an oxidizable metal film, as defined in claim 7, wherein:

the positive voltage applied to the metal layers with respect to the metal layers is slowly increased over the durateon to decrease the conductivity through the dielectric layer.

9. A method of storing information in a plurality of thin-film capacitors, each having a layer of conductive metal contacting a dielectric layer formed by anodizing a surface of an oxidizable metal film, comprising the steps of:

applying a positive voltage to a metal layer with respect to a metal film of a selected capacitor for a duration sufficient to decrease the conductivity through the dielectric layer of the selected capacitor;

sensing the conductivity of the selected capacitor by applying a positive voltage to a metal layer with respect to the metal film of the selected capacitor; and applying a negative voltage pulse to said metal layers with respect to said metal films to condition said capacitors into a high conductivity state.

10. A method of storing information in a plurality of thin-film capacitors, each having a layer of conductive metal contacting a dielectric layer formed by anodizing a surface of an oxidizable metal film, as defined in claim 9, wherein:

the positive voltage applied to the metal layer with respect to the metal film of the selected capacitor is slowly increased over the duration to decrease the conductivity through the dielectric layer of the selected capacitor.

References Cited

UNITED STATES PATENTS

| | | | |
|---|---|---|---|
| 3,412,220 | 11/1968 | Puppolo et al. | 317—258 X |
| 3,423,646 | 1/1969 | Cubert et al. | 340—173 X |
| 2,993,266 | 7/1961 | Berry | 317—234 X |
| 3,359,466 | 12/1967 | Pollach et al. | 317—234 |
| 3,363,240 | 1/1968 | Cola et al. | 340—173 |
| 3,386,011 | 5/1968 | Murray et al. | 317—101 |

BERNARD KONICK, Primary Examiner

J. F. BREIMAYER, Assistant Examiner

U.S. Cl. X.R.

317—246, 258